United States Patent Office 2,722,764
Patented Nov. 8, 1955

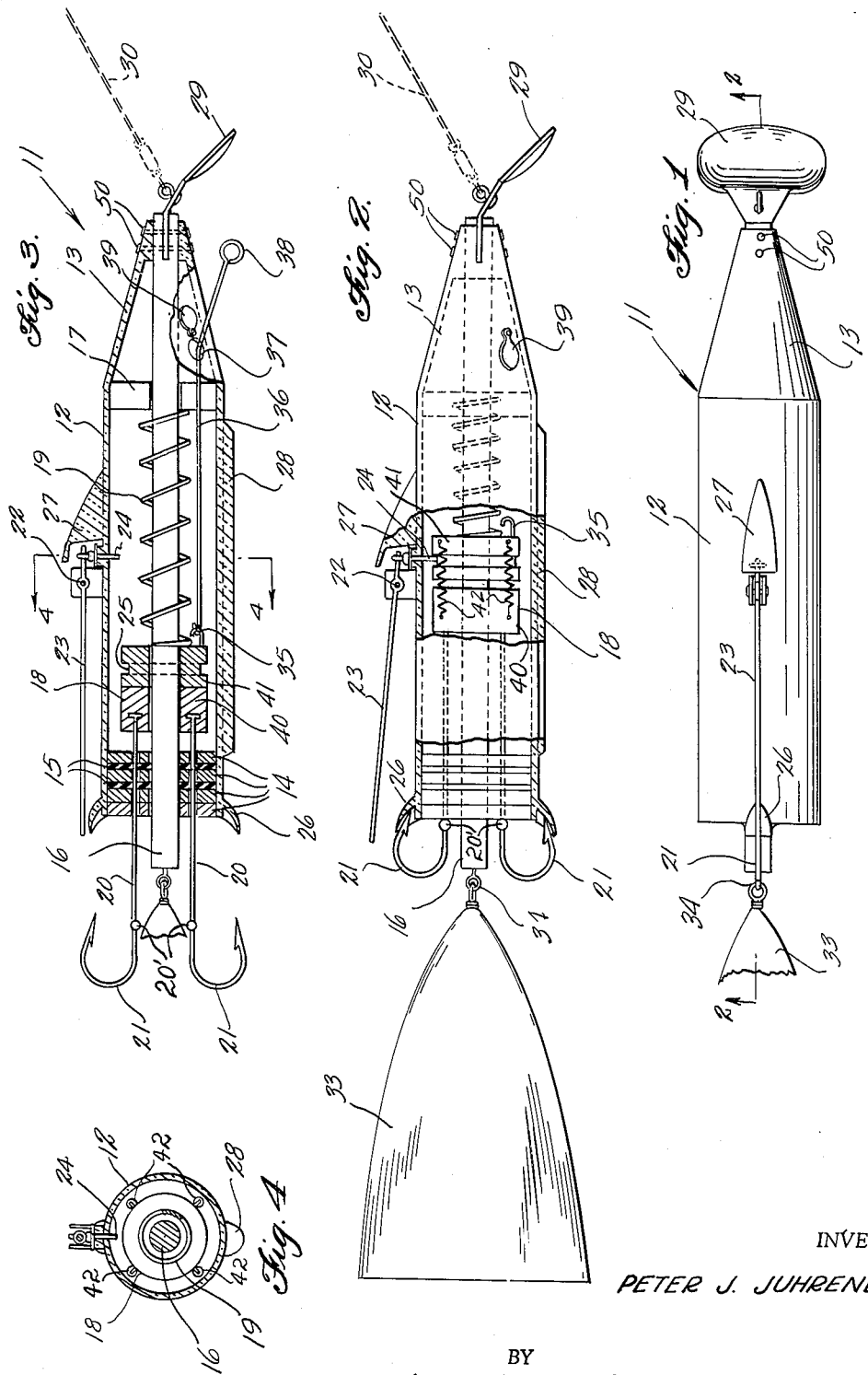

2,722,764

FISHING LURE

Peter J. Juhrend, Compton, Calif.

Application October 2, 1953, Serial No. 383,775

1 Claim. (Cl. 43—35)

This invention relates to fishermen's equipment, and more particularly to an improvement in fishing lures.

The main object of the invention is to provide a novel and improved fishing lure which is simple in construction, which is arranged with means for shielding the barbs of the hooks thereof against entanglement with weeds or other debris, and which is provided with means for extending the hooks responsive to the striking of the lure by a fish.

A further object of the invention is to provide an improved fishing lure which is inexpensive to manufacture, which is attractive to fish, which is durable in construction, and which is automatic in operation.

Further objects and advantages of the invention will become apparent from the following description and claim, and from the accompanying drawings, wherein:

Figure 1 is a top plan view of an improved fishing lure constructed in accordance with the present invention, the hooks being in retracted positions.

Figure 2 is a side elevational view, partly in longitudinal vertical cross section, taken on the line 2—2 of Figure 1.

Figure 3 is a longitudinal vertical cross sectional view taken through the lure with the hooks thereof in extended positions.

Figure 4 is a vertical cross sectional view taken on the line 4—4 of Figure 3.

Referring to the drawings, the fishing lure is designated generally at 11 and comprises a hollow body 12 tapering at one end, as shown at 13, and being provided at its opposite end with the end wall defined by a plurality of circular plate members 14 secured in the end portion of body 12, as shown in Figure 3. Interposed between certain of the circular plate members 14 are the sealing gaskets 15 arranged in the manner illustrated in Figures 2 and 3.

Axially secured in the body 12 and extending through the plate members 14 and the gaskets 15, as shown in Figure 3, is a guide rod 16. The guide rod 16 extends through an annular abutment member 17 secured in the body 12 adjacent the tapered portion 13 thereof.

Slidably engaged on the guide rod 16 is the annular plunger 18, said annular plunger being biased toward the end plates 14 by a coiled spring 19 which surrounds the rod 16 and bears between the abutment member 17 and the plunger 18. Secured to the plunger 18 are the ends of the shanks 20 of a plurality of hooks 21, said shanks extending longitudinally through the plates 14 and being sealingly engaged by the gasket members 15, the shanks 20 being slidable parallel to the rod 16. Hooks 21 are provided with spherical stops 20' which limit the forward movement of the hooks by contacting the rear end of the body 12.

Pivoted externally to the body 12 at 22 is a lever member 23 to one end of which is secured a detent arm 24 which extends slidably and sealingly into the body 12 and which is adapted to at times lockingly engage in an annular groove 25 formed on the periphery of the plunger 18 to retain said plunger in a retracted position. The opposite end of the lever 23 extends adjacent the rear end of the body 12, namely, adjacent the wall defined by the end plates 14. Said rear end of the body 12 is provided with the respective hollow guard lugs 26 adapted to receive the barb portions of the hooks 21 when said hooks are in retracted positions thereof, as shown in Figure 2.

A hollow guard lug 27 is provided on the body 12 for protecting the detent member 24 at its connection with the lever 23 against entanglement with weeds or the like.

Diametrically opposite the lever 23, the body 12 is formed with the depending, longitudinally extending keel element 28 which serves to stabilize the lure device as it is pulled longitudinally through the water. Secured rigidly by pins 50 to the forward end of the body, namely, at the apex of the conical portion 13 is a downwardly and forwardly inclined plate member 29 to which the fishing line 30 is connected.

Secured to the end of the rod 16 adjacent the hooks 21, 21 is the freely movable tail member 33 which may be of brightly colored fabric or other flexible material, the tail 33 being pivoted at 34 to the end of the rod 16 and being freely swingable around the pivotal connection 34.

Secured to the forward face of the plunger 18 is a hook 35 which may be engaged by a hooked wire 36 inserted through an aperture 37 provided in the conical forward portion 13 of the body of the lure, said wire 36 being provided with a handle loop 38. Designated at 39 is a pivoted cover provided on the conical portion 13 which may be swung into overlying sealing relationship with the aperture 37, as shown in Figure 2. By rotating the cover 39 to the open position thereof, shown in Figure 3, the hooked wire 36 may be inserted through the opening 37 to engage with the hook 35, whereby the plunger 18 may be retracted to the position thereof shown in Figure 2, wherein the detent 24 may lockingly engage in the annular groove 25. This may cause the sections 40 and 41 to become slightly separated, as shown in Fig. 2.

The lure may thus be set to the position shown in Figure 2, after which the lure may be cast. When a fish strikes the lure, the lever 23 is swung by the fish counterclockwise, as viewed in Figure 2, to retract the detent member 24 from the groove 25, releasing the plunger 18, whereby the spring 19 moves the plunger rearwardly and extends the hooks 21. Thus, the hooks 21 are automatically extended responsive to the striking of the lure by a fish.

The inclined front plate 29 and the flexible tail 33 provide a swimming action and add a life-like and attractive appearance to the lure which makes the lure effective in attracting fish.

The body 12 is preferably made of transparent material, such as transparent plastic material. However, any suitable material may be employed for said body member and the other elements of the lure.

The plunger member 18 may be formed of two annular sections 40 and 41 slidably mounted on the rod 16, said annular sections being biased together by a plurality of coiled springs 42 connecting said sections, as shown in Figure 2, whereby the hooks 21 may be resiliently held in the hollow guard lugs 26 when the plunger element 18 is in the retracted position thereof shown in Figure 2.

While a specific embodiment of an improved fishing lure has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A fishing lure comprising a hollow, elongated body;

means at one end of the body to connect a line thereto; a plunger slidably mounted in the body for movement between opposite extreme positions, said plunger including front and rear plunger sections and spring means connected between the sections; means resiliently and yieldably biasing the plunger in one direction to one of said extreme positions; detent means in the body releasably engageable with the front plunger section in the other extreme position of the plunger to normally hold the plunger against movement in said direciton; lever means on the body connected with the detent means and arranged for movement by a fish striking the lure to shift the detent means to a plunger-releasing position; hooks connected to the rear plunger section, said hooks including shanks slidably mounted in the other end of the body and hook portions on the shanks having barbed ends; and hollow guard lugs formed on the body receiving the barbed ends of the hook portions in said other extreme position of the plunger, said spring means being tensioned to exert pull on the rear plunger section in a direction to urge the rear section into contact with the front section in the detent-engaged position of the front section to draw said barbed ends of the hooks into engagement with the guard lugs.

References Cited in the file of this patent

UNITED STATES PATENTS

| | | |
|---|---|---|
| 610,098 | Sly | Aug. 30, 1898 |
| 945,091 | Hanel | Jan. 4, 1910 |
| 1,354,952 | Bullock | Oct. 5, 1920 |
| 2,485,946 | Watt | Oct. 25, 1949 |

FOREIGN PATENTS

| | | |
|---|---|---|
| 90,698 | Sweden | Nov. 2, 1937 |